A. MOORHOUSE.
MOTOR VEHICLE.
APPLICATION FILED JULY 14, 1920.

1,400,566. Patented Dec. 20, 1921.

Inventor,
Alfred Moorhouse,
By Millen Tibbetts Atty.

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF DETROIT.

MOTOR-VEHICLE.

1,400,566. Specification of Letters Patent. Patented Dec. 20, 1921.

Application filed July 14, 1920. Serial No. 396,170.

*To all whom it may concern:*

Be it known that I, ALFRED MOORHOUSE, a citizen of the United States, and resident of Detroit, Wayne county, State of Michigan, have invented certain new and useful Improvements in Motor-Vehicles, of which the following is a specification.

This invention relates to motor vehicles and particularly to the driving means for the rear axle.

The principal object of the invention is to provide means for obtaining a double reduction in speed in the driving line between the main change speed mechanism and the wheels, which shall be capable of being mounted on the rear axle, which shall be adapted for ready removal from the vehicle as a unit without necessitating disassembling the vehicle in respect to other parts, and which also shall be capable of affording ample ground clearance.

Figure 1:
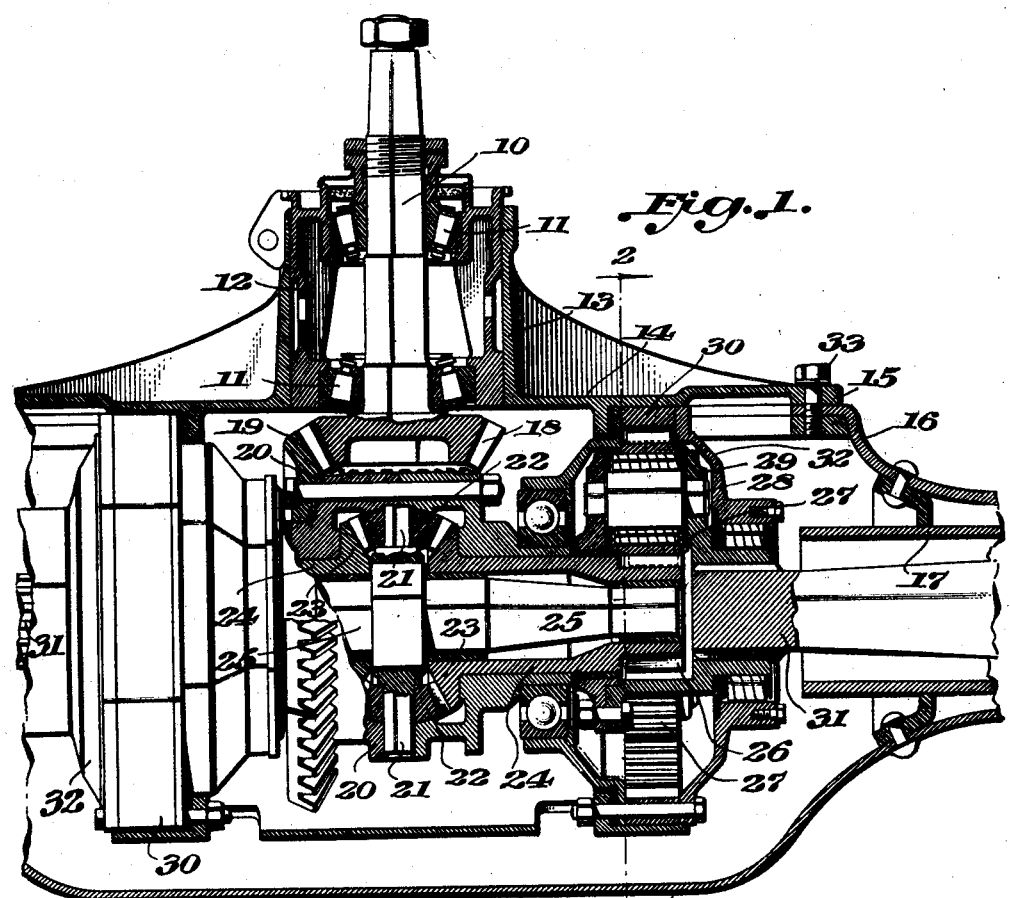
Figure 2:
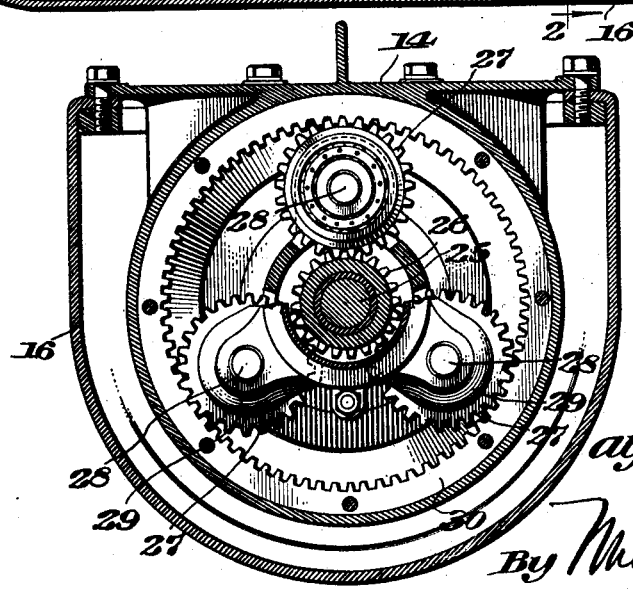

With these objects and others in view, my invention is embodied in preferable form in the construction and arrangement hereinafter described and illustrated in the accompanying drawings, in which:

Figure 1 is a longitudinal section of a motor vehicle axle embodying the invention; and Fig. 2 is a transverse section on the line 2—2 of Fig. 1.

Referring to the drawings, 10 is a pinion shaft adapted to be connected at its forward end with a universal joint in the propeller shaft line. This shaft section constitutes in effect a continuation of the propeller shaft. The shaft 10 is mounted in bearings 11, which, in turn, are carried by a casing 12 threaded in a cylindrical extension 13 of a housing or support 14. This housing constitutes the removable inclosing body for the gearing, and it consists of a bowl-shaped body having its axis extending horizontally and transversely of the vehicle. It has a flange 15 lying in a vertical plane at a right angle to the transverse axis of the vehicle and adapted to be secured to a corresponding flange 16 of an enlarged body portion of the axle housing 17.

The shaft section 10 carries on its rear end within the housing a bevel pinion 18 which is adapted to mesh with a bevel gear 19. As the axle is the same on both sides of the differential, only one side will be described in detail. The gear 19 is fixed on a split differential housing 20, and when the gear is driven, the housing will be rotated in its bearings 20'. The first reduction from the driving shaft to the wheel is thus obtained through these bevel gears 18, 19.

Mounted in the housing 20 on shafts 21 are differential pinions 22, which mesh with bevel gears 23 having extended hub sleeves 24 mounted on a spindle 25. Each sleeve 24 has formed thereon a gear 26, adapted to mesh with a pinion 27 which is journaled on shaft 28 in the cage 29. This pinion 27 constitutes a planet gear and it engages a ring gear 30 which is fixed to the housing 14. The cage 29, on which the pinions 28 are mounted, is keyed to the axle shaft 31 and adapted to drive the latter. 32 is a retainer member for bearings 32' for the cage, and also constitutes an outside casing member for the gears. The cage 29 also has a bearing on the sleeve 24 as shown at 29'. The gear 26, the pinions 27 and the fixed ring gear 30 constitute a planetary gear system, which adds a second reduction in gear ratio to that obtained by means of the bevel gears 18 and 19.

It will be seen that the gears provided for these two reductions and also the differential mechanism are located within and carried by the housing 14. This housing is detachably secured by means of bolts 33 to the main housing, these bolts passing through the vertical flange 15, so that after the axle shafts 31 have been withdrawn from the axle, the bolts 33 may be removed and then the entire housing 14 containing the driving gears may be drawn forward horizontally so as to remove the assembly as a unit from the axle housing without necessitating the disassembling of the axle housing. Of course, the pinion shaft 10 must have been disconnected from the universal joint in order to permit this unitary withdrawal of the gear housing.

Having thus described my invention, what I claim and desire to secure by Letters Patent is:—

1. In a motor vehicle, the combination with an axle casing, of a driving shaft mounted in a casing, a differential housing mounted in the casing, gearing between said shaft and housing, differential driving and driven gears in said differential housing, said driven gears having extensions, driven axle sections, and planetary gearing means between said driven differential gears and said axle sections and having a bearing on said extensions.

2. In a vehicle axle, the combination with the differential gearing including a driven bevel gear having an extension, of a driven axle section, and planetary gearing means between said differential gearing and said axle section and having a bearing on said extension.

3. In a vehicle axle, the combination with the differential gearing including a driving bevel gear having an extension, of an axle section in line with said gear, a pinion on said extension, a ring gear in the plane of said pinion, a cage connected to said axle section, and gears mounted in said cage and adapted to mesh with the gear on said extension and said ring gear.

In testimony whereof I affix my signature.

ALFRED MOORHOUSE.